(12) United States Patent  (10) Patent No.: US 6,345,727 B1
Kazou  (45) Date of Patent: Feb. 12, 2002

(54) CARD CASSETTE

(75) Inventor: Osamu Kazou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/550,795

(22) Filed: Apr. 17, 2000

(30) Foreign Application Priority Data

Apr. 15, 1999 (JP) .......................................... 11-108068

(51) Int. Cl.$^7$ ................................................ B65H 1/00
(52) U.S. Cl. ..................................................... 221/145
(58) Field of Search ................................ 221/145, 167; 446/8; 902/9, 13; 150/147, 149; 216/425; 206/233; 312/35, 183; 211/41.9

(56) References Cited

U.S. PATENT DOCUMENTS

| | | | | |
|---|---|---|---|---|
| 4,186,977 A | * | 2/1980 | Golovich et al. | ....... 312/215 X |
| 4,580,422 A | * | 4/1986 | Wills | ......................... 70/63 X |
| 4,597,340 A | * | 7/1986 | Huckle | ...................... 109/45 X |
| 4,638,746 A | * | 1/1987 | Ishigure | ..................... 109/52 X |

* cited by examiner

*Primary Examiner*—Christopher P. Ellis
*Assistant Examiner*—Kenneth W Bower
(74) *Attorney, Agent, or Firm*—Young & Thompson (57) ABSTRACT

A card cassette of the present invention comprises an outer box 1, an inner box 2, a shutter 3 which is pivotably provided in the inner box and is urged by a pair of shutter springs 6, a pair of slide guide members 4, a pair of slide springs 5 for urging the slide guide members. A pair of pins 11 are fixed on a table on which the card cassette is to be set. As soon as the card cassette is mounted on the table, the pins will be inserted through a pair of pin holes 8 of the outer box so that each pin can engage into a notch 4a of a slide guide member. In this way, each slide guide member is caused to slide in a direction shown by an arrow in the drawings against an acting force of each slide spring. As a result, since an inclined surface 4b of each slide guide member is released from the shutter, the shutter will be opened by virtue of each shutter spring.

9 Claims, 6 Drawing Sheets

CARD CASSETTE

BACKGROUND OF THE INVENTION

1. Field of the Invention

The present invention relates to a card cassette to be attached to a card producing apparatus.

2. Description of the Related Art

In recent years, more and more card producing apparatus have been put into actual use. In fact, these card producing apparatus are used with unattended contracting machines set by a loan company, capable of printing and producing membership cards (having attached thereon magnetic stripes). In practice, a card producing apparatus is usually mounted on an unattended contracting machine, and a security associated with the cards to be produced by the card producing apparatus is considered to be quite important. In particular, it is very important for people to take precautions when cards are supplemented in order that the cards can be prevented from being stolen.

In a conventional card producing apparatus, cards are usually stored in a case-like area within the apparatus on which a hopper has been fixed. In order to prevent a possible theft, the hopper was usually covered up by a cover means which can be locked up by a key. When the cards within the hopper have all been produced out, new cards have to be supplied into the hopper. This, however, will cause a security problem when the cards are being supplemented into said hopper.

When cards are to be supplemented, since the hopper has been previously fixed on the card producing apparatus, a person responsible for the card supplement has to unlock the cover means and to set the cover means through his manual operation. When an operation for supplementing cards is carried out by a guard man in accordance with an instruction from a loan company, the guard man will have a chance to directly touch the cards which are membership cards of the loan company, hence giving him a chance of stealing one or more cards.

Since the cards produced by the card producing apparatus have magnetic stripes and since there is a high possibility that a card may be used for evil purpose if it is stolen, it is usually required that the same security measure be taken as if we are dealing with some real money, i.e., cash. For this reason, when card supplement operation is to be carried out, such an operation should be performed by a staff member of a loan company.

However, as far as a loan company is concerned, it does not usually wish to send many of its staff members to many of its unattended contracting machine booths. Instead, a loan company often wants a security company (having a contract with the loan company) to carry out the card supplement. In practice, it is required that card supplement be performed in the same manner as in an automatic cash paying machine. Namely, it is necessary to prepare a card cassette (a money safe) into which cards have been set in advance, so that the desired card supplement may be effected simply by replacing a hollow cassette (having no card remaining therein) with the prepared card cassette.

SUMMARY OF THE INVENTION

It is an object of the present invention to provide a card cassette which can be easily replaced by another one, without a necessity of having a guard man to touch the cards.

According to the present invention, a card cassette is provided having a shutter opening/closing means which includes a pair of pins for positioning the card cassette attached in advance on a card producing apparatus, and having a pair of pin holes formed on the card cassette, so that the pair of pins can be inserted through the pair of pin holes in order to control a shutter provided on a card outlet of the card cassette, in a manner such that when the card cassette is attached on to the card producing apparatus, the shutter is opened automatically, when the card cassette is released from the card producing apparatus, the shutter is closed automatically, characterized in that the card cassette comprises:

the opening/closing means having a pair of slide guide members each including a notch so formed that when each of the pins has been inserted through each of the pin holes of the card cassette, each of the pins can get in contact with an inclined portion of the notch, also having a pair of slide springs urged against a sliding movement of each of the slide guide members, further having the shutter so formed that said shutter can get in contact with the inclined portion of each of the slide guide members and that as a result of the sliding movement of each of the slide guide members, the shutter can be opened;

the card outlet for producing a card one by one from the card cassette; and a protection means capable of preventing a possible contact from the outer side of the card cassette to the cards.

Further, according to the present invention, a double-structured card cassette is provided which is adapted to store a number of cards and can be installed on to a card producing apparatus, characterized in that said card cassette comprises:

an opening/closing means provided in an inner box and at the card outlet of the card cassette, which is closed automatically as soon as the card cassette is released from the card producing apparatus, and is opened automatically as soon as the card cassette is installed on to the card producing apparatus;

the card outlet for producing a card one by one from the card cassette; and a protection means capable of preventing a possible contact from the outer side of the card cassette to the cards.

DESCRIPTION OF THE PREFERRED EMBODIMENTS

Figure 1A:
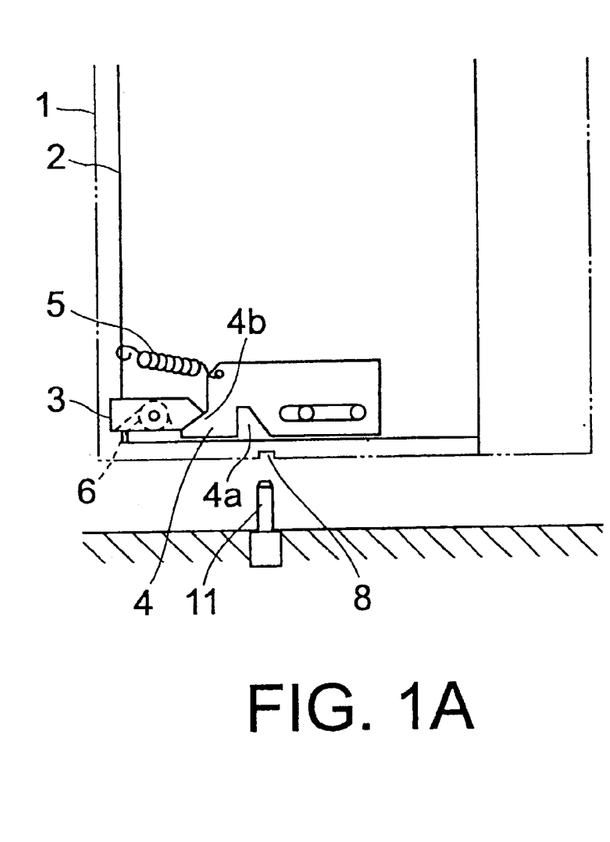
FIG. 1A is a side view schematically indicating a card cassette made according to a first embodiment of the present invention, showing a condition in which a shutter has been closed.
Figure 1B:
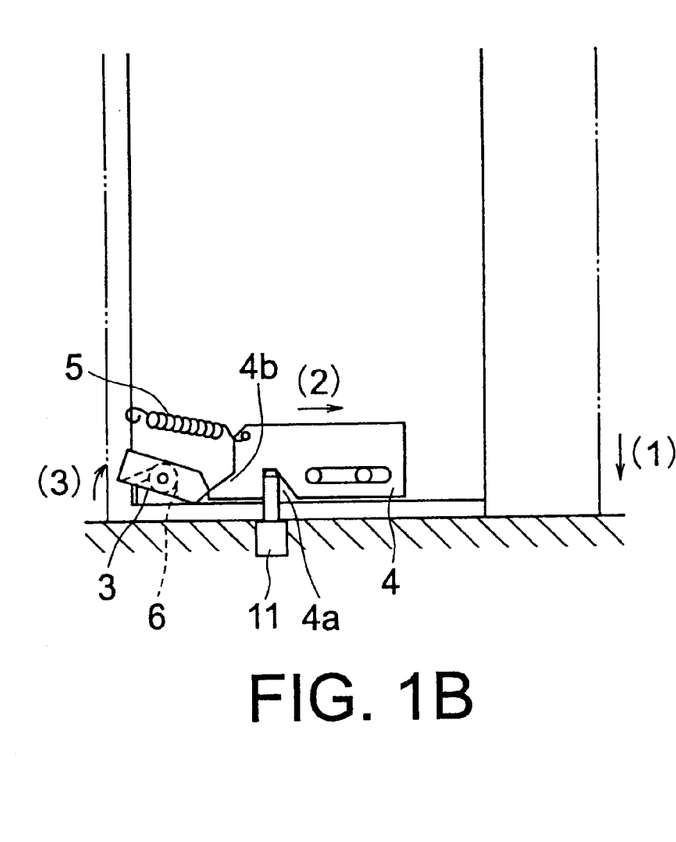
FIG. 1B is a side view schematically indicating the card cassette made according to the first embodiment of the present invention, showing a condition in which a shutter has been opened.
Figure 2:
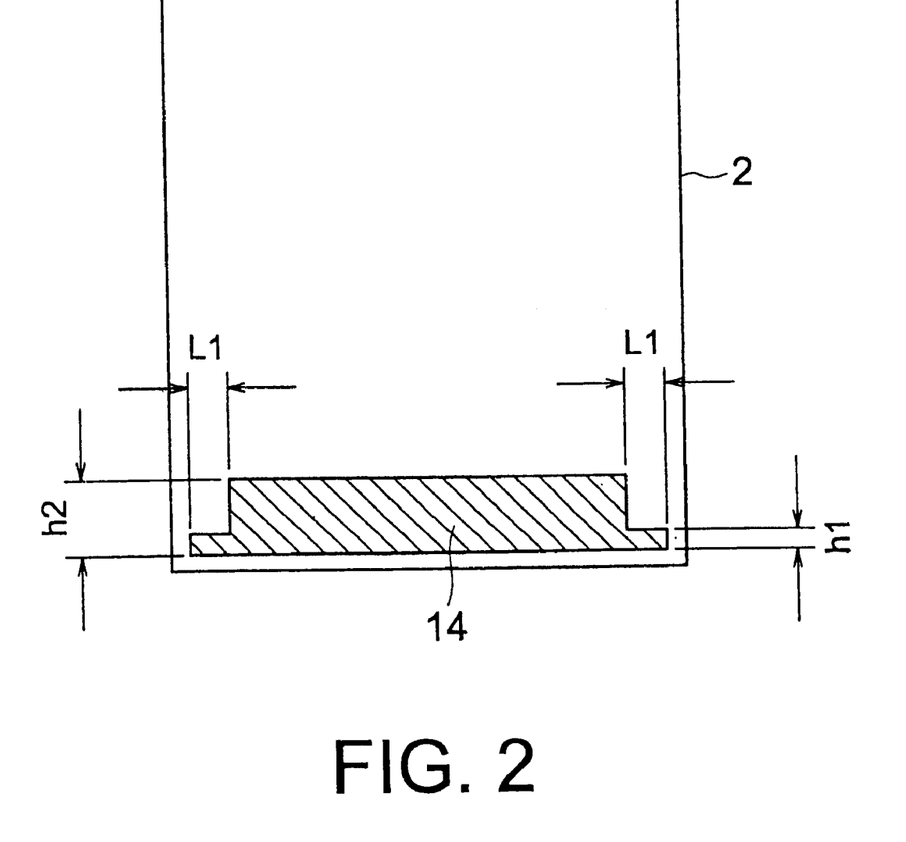
FIG. 2 is a front view schematically indicating the card cassette made according to the first embodiment of the present invention, showing a card outlet of the card cassette.
Figure 3A:
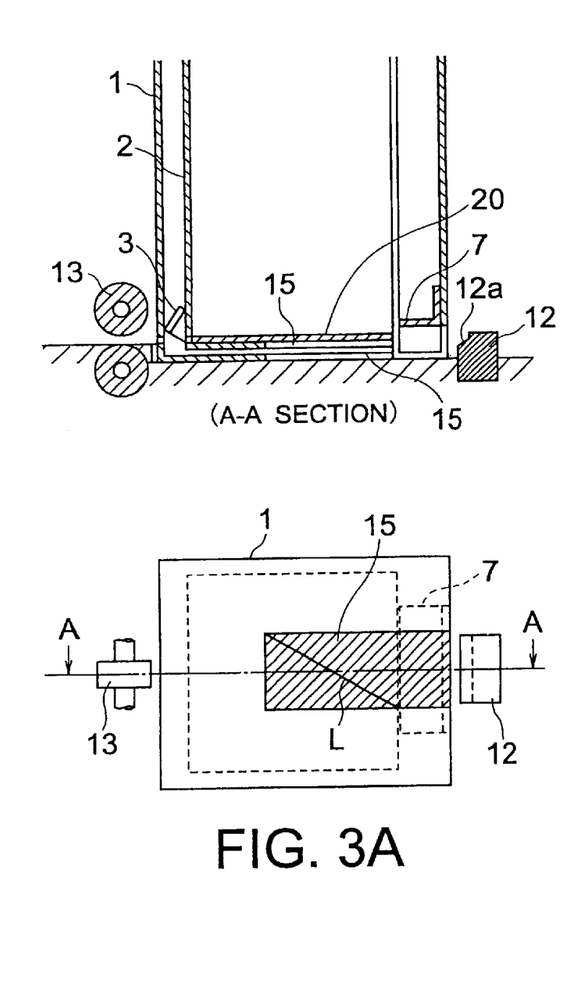
FIG. 3A is a bottom view schematically indicating the card cassette made according to the first embodiment of the present invention, showing a condition in which a card has not been fed out yet. The figure also includes a cross sectional view taken along line A—A in the bottom view.
Figure 3B:
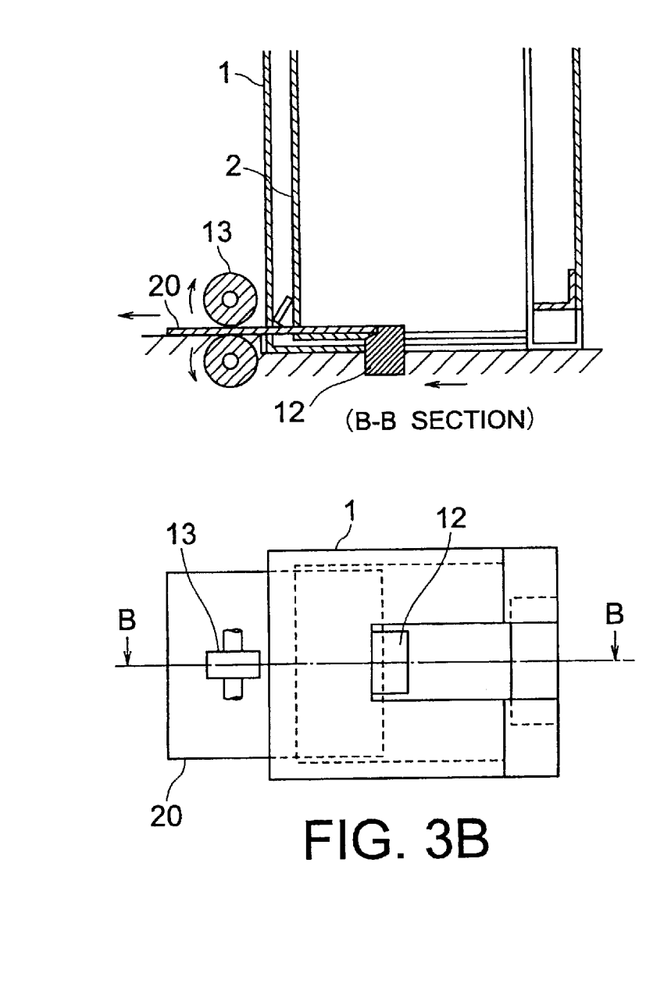
FIG. 3B is a bottom view schematically indicating the card cassette made according to the first embodiment of the present invention, showing a condition in which the card is just in its process of being fed out. The figure also includes a cross sectional view taken along line B—B in the bottom view.
Figure 4:
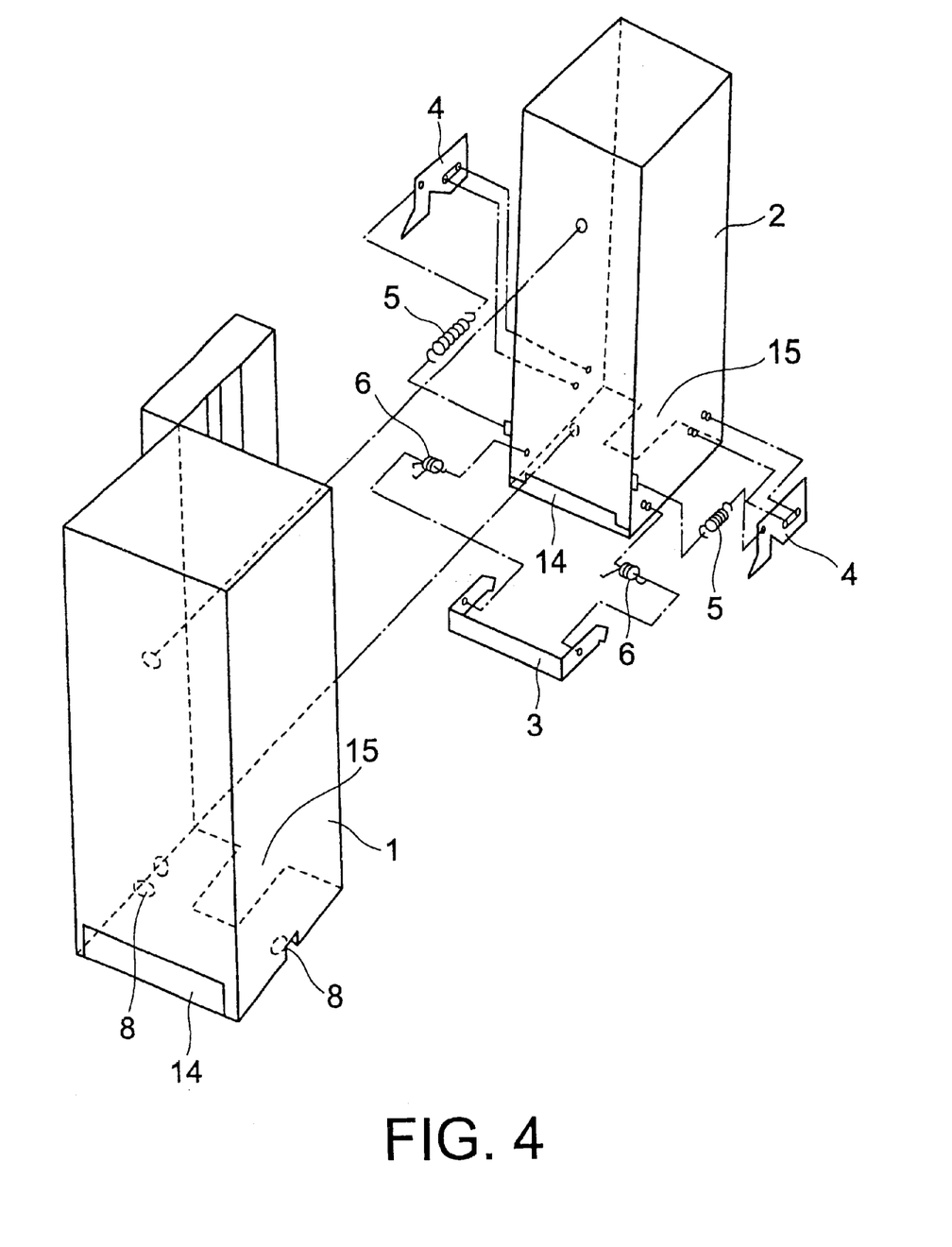
FIG. 4 is an exploded perspective view schematically indicating the card cassette made according to the first embodiment of the present invention.

A first embodiment of the present invention will be described in detail in the following with reference to the accompanying drawings. FIGS. 1A and 1B are views for schematically indicating an operation of a shutter of a card cassette made according to the present invention. FIG. 2 is a view schematically showing a card outlet of the card cassette of the present invention. FIGS. 3A and 3B are views schematically indicating an operation for feeding out a card from the card cassette. FIG. 4 is an exploded perspective view of the card cassette.

FIG. 4 is used to describe a structure of the card cassette made according to the present invention. As shown in the drawing, the card cassette comprises an outer box 1, an inner box 2, a shutter 3, a pair of slide guide members 4, a pair of slide springs 5, a pair of shutter springs 6, a spacer 7 (see FIG. 3A). In detail, the card cassette has a structure formed by inserting the inner box 2 carrying various parts into the outer box 1.

The outer box 1 has a pair of pin holes 8 allowing a pair of pin 11 to insert therethrough. The pair of pins 11 are in practice for use in opening the shutter 3. In addition, the outer box 1 has a card outlet 14 and a kicker operating hole 15. Moreover, the card cassette has a key-attached door (not shown) and a cassette handle (not shown), a window (not shown) for detecting an amount of remaining cards 20, a plate (not shown) for pressing a card 20 so as to prevent it from moving up or down when being transported, and a guide means (not shown) for making even the ends of several cards. Further, a spacer 7 is provided on the key-attached door, so that the card 20 can be prevented from being accidentally taken out through the kicker operating hole 15.

On the other hand, the inner box 2 also has a card outlet 14 which is so formed that it is possible to prevent two pieces of cards from lying one upon another when being fed out and is capable of feeding out a pre-embossed card. Further, the inner box 2 has a kicker operating hole 15, sliding pins (not shown) capable of effecting a sliding movement of the slide guide members 4, a shutter pin (not shown) serving as a shaft capable of effecting an opening or closing movement of the shutter 3, and projections (not shown) for attaching and pulling the slide springs 5. In fact, each slide guide member 4 is located in a position of slide pin, and is connected with one slide spring 5 fixed on one projection. Further, the shutter 3 is connected with the shutter pin and is interposed between the two shutter springs 6. In this way, a slide guide member 4, a slide spring 5 and a shutter spring 6 are provided on either side of the inner box 2.

In FIGS. 1A and 1B there is indicated one of the pair of pins 11, which are provided for opening or closing the shutter 3. Each pin 11 is fixed on a table on which the card cassette is to be mounted so as to be set thereon.

In FIGS. 3A and 3B, there are indicated a kicker 12 and a pair of feeding-out rollers 13, both of which are provided for effecting an operation of feeding out the cards 20 from the cassette. The kicker 12 is caused to move leftwardly and rightwardly in a manner as shown in the drawings (however, a driving section for operating the kicker 12 is not shown in the drawings). In detail, when the kicker 12 is moved to the left (in the drawings), it will press the rear end of a card 20 so as to feed the card 20 out of the cassette. After the card 20 has been fed out, the kicker 12 is caused to move rightwardly so as to return to its home position. The pair of the feeding-out rollers 13 are disposed in front of a card outlet 14 of the cassette, with one roller positioned above the other. In this way, since the card 20 fed out by the kicker 12 is required to be moved away completely from the cassette, the pair of feeding-out rollers 13 are rotated in different directions shown by the arrows in the drawings, thereby feeding out the card 20 in a desired manner (however, a driving section for rotating the pair of feeding-out rollers 13 is not shown in the drawings).

Next, an operation of the card cassette made according to the present invention will be described with reference to the accompanying drawings. At first, an operation of the shutter 3 of the card cassette will be explained with reference to FIGS. 1A and 1B.

FIG. 1A is used to illustrate a condition before the card cassette is set onto the card producing apparatus. At this time, the shutter 3 is in its closed position. An operation for setting the card cassette onto the card producing apparatus may be completed by fitting a pair of pin holes 8 formed on the bottom of the cassette (the outer box 1) into a pair of pins 11, in a direction as shown by an arrow (1) in FIG. 1B. As soon as each pin 11 is inserted into a corresponding pin hole 8 formed on the bottom of the outer box 1, a notch 4a of each slide guide member 4 will be pressed by a pin 11. As a result, each slide guide member 4 will be caused to move to the right in a direction shown by an arrow (2) in FIG. 1B. In this way, as soon as each slide guide member 4 is moved to the right in the drawing, an inclined surface 4b of each slide guide member 4 pressing the shutter 3 to prevent it from being opened will move away from the shutter 3, so that the shutter 3 is opened (in a direction shown by an arrow (3) in the drawing) by virtue of a spring force from a corresponding shutter spring 6.

On the other hand, when the outer box 1 is moved so as to be separated from the pins 11 (i.e., moved in an upward direction in the drawings), the slide guide members 4 pressed by the pins 11 will be moved to the left in the drawing by virtue of a spring force from each slide spring 5, thereby closing the shutter 3.

Then, an operation for feeding out a card will be explained in the following with reference to FIGS. 3A and 3B. Here, FIGS. 3A and 3B are used to illustrate a condition in which the card cassette has already been set on a card producing apparatus.

As shown in the drawings, a number of cards 20 are set within the inner box 2 (although only one card is shown in the drawings, there are in fact several such cards lying one upon another within the inner box). Thus, since the card cassette is in its condition of having been set within the card producing apparatus, the shutter 3 is in its opened position. At this moment, the kicker 12 is kept in its home position, and the pair of feeding-out rollers 13 are in their stopped state (see FIG. 3A).

Now, it is assumed that a command for producing a card has been received from a control section. At this time, since the card producing apparatus is going to feed out a card 20, the kicker 12 will be moved to the left in the drawing along a direction represented by an arrow shown in FIG. 3B. Meanwhile, the pair of feeding-out rollers 13 begin to be rotated in the directions shown by two mutually opposite arrows in FIG. 3B. In fact, the kicker 12 is allowed to move in and along a kicker hole 15 formed on the bottom of the card cassette, so as to have the shoulder portion 12a of the kicker 12 to get into engaged with the rear end of a card 20, thereby outwardly pushing the card 20 away from the inner box. In this way, the kicker 12 is at first moved to the left end of the kicker operating hole 15 (see FIG. 3B), so that is stops its movement of outwardly pushing the card 20, and finally returns to its home position. At this moment, the card 20 pushed out by the kicker 12 is at first positioned in front of the card outlet 14 of the card cassette, and then caught between the two feeding-out rollers 13 (in rotation) so as to be further fed out, thereby enabling the card 20 to be completely separated from the card cassette. In this manner, as soon as the card 20 has been completely separated from the card cassette, the rotation of the pair of feeding-out rollers 13 will be stopped.

Next, the card outlet of the card cassette will be described with reference to FIG. 2. In fact, FIG. 2 is used to indicate the inner box 2 of the card cassette, showing a state when viewed through the front side thereof, with the hatched portion representing the card outlet 14.

As shown in the drawing, the card outlet 14 has such a structure that it is narrow at its two ends but broad in its middle. With the use of such a structure, it is possible to smoothly feed out not only a virgin card which has not been embossed, but also an embossed card.

Now, the structure of the card outlet 14 will be described in more detail below. A thickness h1 of each end portion of the card outlet 14 has a value which is larger than the thickness of one virgin card (according to JIS, 0.76 mm±0.08 mm), but smaller than a total thickness of two pieces of such virgin cards. A width L1 is so set that it will not touch an embossed area of a card (according to JIS, an embossed area of a card should be set so as to have a size extending between 2.54 mm from the lower edge of the card and 24.03 mm from the same lower edge of the same card. Therefore, said width is only required to be smaller than 2.54 mm from which an embossed area begins to extend. However, said width is also allowed to be made larger in view of a format of a card to be fed out). On the other hand, the width h2 of the middle portion of the outlet is so set that it will not touch an embossed area of an embossed card (according to JIS, the height of embossed characters is 0.48 mm+0/−0.08 mm from the surface of an embossed card. Therefore, when the thickness of a card is added, a total thickness will be 1.32 mm at most, but is preferred to be 1.5 mm or more. Moreover, if we take into account a possible warpage of a card, it is preferred that the total thickness be 2.6 mm or more). In this way, the card outlet 14 having the above shape decided by the above mentioned size, is so formed that each end of the card outlet 14 has a width h1 which allows the passing of only one card. For this reason, it is sure to exactly prevent the feeding-out of two cards lying one upon another, thereby avoiding the feeding-out of two cards at the same time. In addition, by virtue of the middle portion of the card outlet, it is possible to smoothly feed out an embossed card on which embossed characters have been formed in advance.

Next, the security (a capability of preventing a crime) of the card cassette will be described in the following.

A method of taking the card 20 out of the card cassette is a normal operation which may be carried out by using a key for the door of the cassette so as to open the door of the card cassette. However, besides the normal method of taking out the card 20 from the card cassette, it is also allowed to consider other abnormal methods. For example, the card cassette itself can be broken in order to take out the cards 20, or the cards 20 can be taken out through the card outlet 14. Alternatively, the cards 20 can be taken out through the kicker operating hole 15. Accordingly, the following description will be given only to explain how a security can be established for a method of taking out the card 20 through the card outlet 14 and a method of taking out the card 20 through the kicker operating hole 15. However, since there is no effective measure for preventing the breaking of the card cassette itself, an explanation about a security for preventing this action is therefore omitted hereby.

As to the card outlet 14, the shutter 3 is provided on the inner box 2. Since the shutter 3 can be opened only after it has been set in the card producing apparatus, when the card cassette is released from the card producing apparatus, the shutter can not be opened easily. For this reason, it is sure for the card cassette to obtain a security of preventing the cards 20 from being illegally taken out of the card cassette.

As to the kicker operating hole 15, since the kicker 12 is used to push out the card 20, it is absolutely necessary for the kicker 12 to have a connecting portion capable of contacting from the outside of the card cassette to the cards 20 within the cassette, so that it is possible for the kicker 12 to contact from the kicker operating hole 15 to the cards 20 in the card cassette. However, since a spacer 7 is installed (in a manner shown in FIGS. 3A and 3B) on the inner side of the cassette door attached on the outer box 1, it is sure to prevent a card 20 from being taken out. In fact, the spacer 7 is made to be larger than the width of the kicker operating hole 15, the diagonal line L of a rectangular shape of the kicker operating hole 15 within the inner box 2 is set to be shorter than a shorter edge of a card 20 (see FIG. 3A which is a bottom view of the card cassette). Further, the spacer 7 is required to be attached as close as possible to the bottom of the outer box 1, in a manner such that even if the kicker 12 is operated, it will not touch the spacer 7. Accordingly, since the spacer 7 is attached in the above mentioned manner, it is sure to exactly prevent the cards 20 from being taken out of the card cassette even if the cards within the cassette is made vertical, horizontal or inclined.

In this way, since it is not easy to take a card 20 out of the card cassette which has been released from the card producing apparatus, it is possible to ensure a desired security (against a possible theft).

In the following, a second embodiment of the present invention will be described with reference to the accompanying drawings. Although it has been described in the above first embodiment that the shutter 3 of the card outlet 14 will be opened by inserting the card cassette on to the pins 11 provided on the bottom side of the card cassette, it is also possible that the pins 11 may be provided not only on the bottom side of the card cassette, but also on the front side of the card cassette (card outlet side), or on the side faces of the cassette, thereby similarly opening the shutter 3 of the card outlet 14. Namely, if the location of each pin 11 and shape of each slide guide member 4 are changed in a manner such that each slide guide member 4 may be slidden, it is still possible to open the shutter 3 of the card outlet 14.

Figure 5:
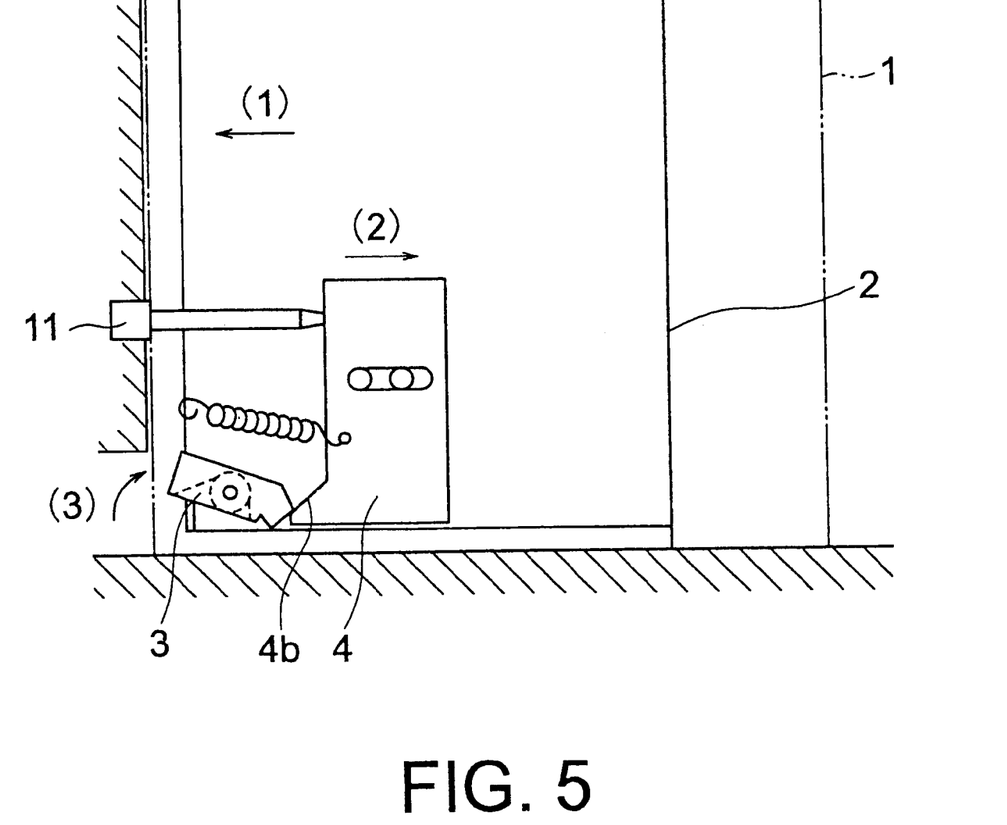
FIG. 5 is a side view schematically indicating a card cassette made according to a second embodiment of the present invention, showing a condition in which a shutter has been opened.

FIG. 5 is used to schematically indicate an example in which a pair of pins are located in the front of the apparatus. As shown in the drawing, as soon as the card cassette (outer box 1) has a relative movement (in a direction (1) shown in the drawing) so that the pins 11 provided on the card outlet side of the apparatus are inserted into the card cassette, each pin 11 will be caused to push each slide guide member 4. At this moment, each slide guide member 4 will be pressed by a pin 11 so as to be moved to the right (in a direction (2) shown in the drawing), thereby opening the shutter 3 (in a direction (3) shown in the drawing).

Although the present invention has a structure in which a pair of pins are used to open the shutter, it is also possible to use several pairs of such pins to open the shutter. With the use of several pairs of pins, it can be expected that the desired security can be further improved.

Figure 6:
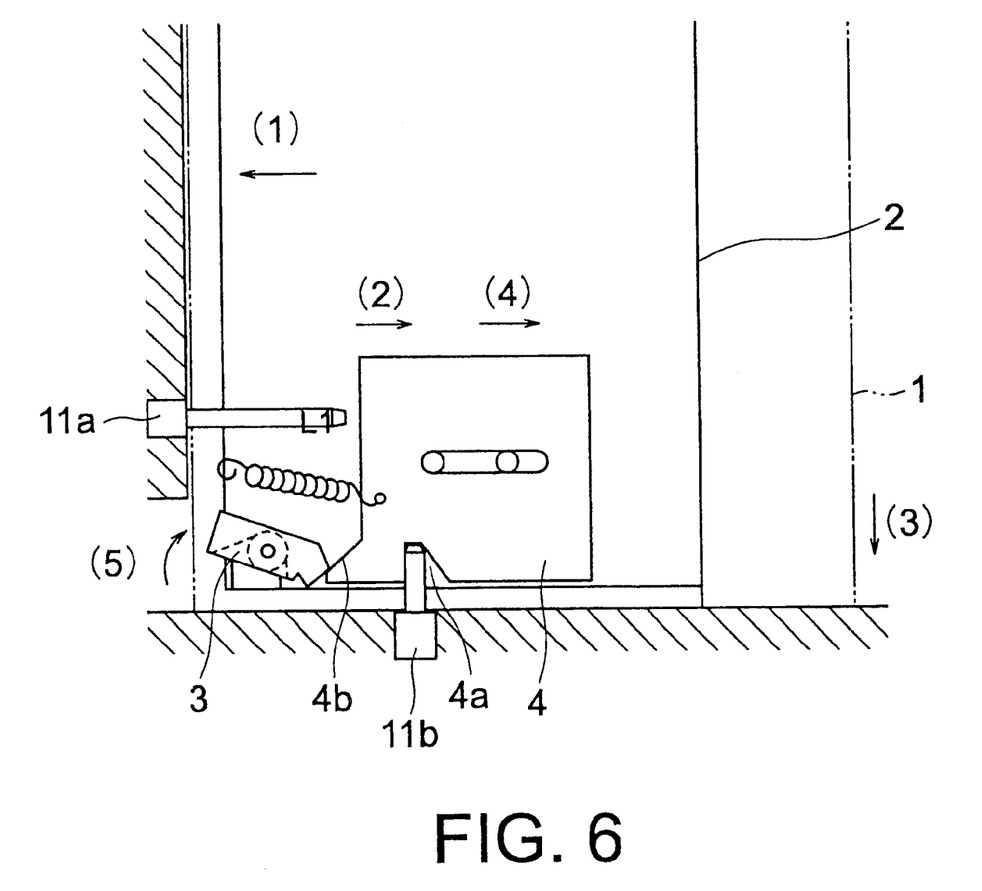
FIG. 6 is a side view schematically indicating a card cassette made according to a third embodiment of the present invention, showing a condition in which a shutter has been opened.

FIG. 6 is used to schematically indicate an example which employs two pairs of pins. At this time, although an operation for installing the card cassette will be a little more difficult, a necessary operation is only to effect a relative movement (in a direction (1) shown in the drawing) of the card cassette (the outer box 1) so that a pair of pins 11a provided on the card outlet side are inserted into the cassette. At this movement, each pin 11a will be caused to push a slide guide member 4 (in a direction (2) shown in the drawing). Further, the cassette is caused to have a relative movement (in a direction (3) shown in the drawing) so that a pair of pins 11b provided on the bottom surface of the apparatus are caused to insert into the cassette. At this movement, by virtue of the pair of pins 11b, each slide guide member 4 is moved still further to the right (in a direction (4) shown in the drawing). In this way, since each slide guide member 4 is exactly moved to the right, it is sure to exactly open the shutter 3 (in a direction (5) shown in the drawing).

In addition, it is also possible that a pair of pins may be arranged in a manner such that the right pin is located in front of the card outlet and the left pin is located on the bottom surface of the apparatus, thereby forming a structure capable of opening the shutter.

With the use of the present invention, it is allowed to expect the following effects.

(1) A structure is so formed that as soon as the card cassette is set on to a card producing apparatus, the shutter of the card outlet will be opened, and that as soon as the card cassette is released from the card producing apparatus, the shutter will be closed. Therefore, it is exactly sure to obtain a desired system which ensures that one or more cards are impossible to be taken out through the card outlet of the card cassette. Further, by adding a spacer in the kicker operating hole, it is exactly possible to form a structure which ensures that one or more cards are impossible to be taken out from the kicker operating hole. In this way, it is sure to improve a security against a possible crime.

(2) By improving the shape of the card outlet, it is exactly possible to prevent two cards from being fed out at the same time, and to enable an embossed card to be fed out in a desired manner.

(3) It is allowed to prepare a cassette in which a number of cards have been set in advance, and to effect card supplement by replacing an old cassette with a new one. In this way, it is easy to complete card supplement without having a person to directly touch the cards, thereby improving a security against a theft during the card supplement operation.

(4) Since, during cassette transportation, it is impossible to take out one or more cards from the card cassette, it is sure to more exactly prevent any possible theft when cassettes are being transported.

What is claimed is:

1. A card cassette which is a double-structured card cassette that is adapted to store a number of cards and can be installed on to a card producing apparatus, wherein the card cassette comprises:

an opening/closing means provided in an inner box and at a card outlet of said card cassette, which is closed automatically as soon as said card cassette is released from said card producing apparatus, and is opened automatically as soon as said card cassette is installed on to said card producing apparatus;

said card outlet for producing a card one by one from said card cassette; and a protection means capable of preventing a possible contact from the outer side of said card cassette to said cards, wherein said card outlet is so formed that an opened height on each end portion of said card outlet is made to be larger than a thickness of one piece of unembossed virgin card, but smaller than two pieces of such unembossed virgin cards, an opened height of the middle portion of said card outlet is made to be larger than a height of an embossed card, thereby preventing a possible feeding-out of two pieces of cards.

2. A card cassette which is a double-structured card cassette that is adapted to store a number of cards and can be installed on to a card producing apparatus, wherein the card cassette comprises:

an opening/closing means provided in an inner box and at a card outlet of said card cassette, which is closed automatically as soon as said card cassette is released from said card producing apparatus, and is opened automatically as soon as said card cassette is installed on to said card producing apparatus;

said card outlet for producing a card one by one from said card cassette; and a protection means capable of preventing a possible contact from the outer side of said card cassette to said cards, wherein said protection means is formed in the following manner, i.e., a kicker for feeding out said card is provided on the bottom surface of said card cassette, a diagonal line of a rectangular shape of a kicker operating hole within said inner box is made shorter than a shorter edge of said card, a spacer is disposed close to said bottom surface in a manner such that it does not hamper the operation of said kicker.

3. A card cassette for holding a plurality of cards and having a first position and a second position, said card cassette comprising:

a card outlet on a first side of said card cassette, said card outlet for outputting said cards one by one from said card cassette;

a shutter, covering said card outlet so that when said card cassette is in said first position, said shutter is opened automatically, and when said card cassette is in said second position, said shutter is closed automatically;

a shutter opening/closing means for opening and closing said shutter, said shutter opening/closing means comprising a pair of slide guide members each including an inclined notch and an inclined portion, and a pair of slide guide springs opposing a sliding movement of each of said slide guide members, said inclined portion of each of said slide guide members contacting said shutter in said first position to open said shutter;

a pair of pin holes on a first end of said card cassette arranged and adapted to receive a pair of pins that engage one each of said inclined notches, respectively, to open said shutter when said card cassette is in said first position and to close said shutter when said card cassette is in said second position; and a protection means for preventing unwanted contact of said cards.

4. A double-structured card cassette adapted to store a plurality of cards and that is detachable from a card producing apparatus, said card cassette comprising:

an inner box;

an outer box surrounding said inner box;

a card outlet in said outer box, said card outlet being closed automatically when said card cassette is detached from the card producing apparatus, and said card outlet being opened automatically when said card cassette is attached to the card producing apparatus, said card outlet outputting said plurality of cards one by one from said card cassette; and a protection means for preventing improper contact of said cards.

5. The card cassette according to claim 4, wherein the card producing apparatus includes a pair of pins for positioning said card cassette and wherein the card cassette further comprises:

a pair of pin holes spaced apart from each other on a first end of said card cassette for receiving the pins of the card producing apparatus;

a pair of slide guide members each including a notch, when said card cassette is attached to the card producing apparatus, the pins contacting an inclined portion of said notch;

a pair of slide springs opposing a sliding movement of each of said slide guide members; and a shutter contacting said inclined portion of each of said slide guide members, said shutter opening as a result of said sliding movement of each of said slide guide members.

6. The card cassette according to claim 4, wherein the card producing apparatus includes a pair of pins for positioning said card cassette and wherein the card cassette further comprises:

a pair of pin holes for receiving the pins of the card producing apparatus;

a pair of slide guide members than have a sliding movement when each of said pins has been inserted through each of said pin holes;

a pair of slide springs opposing said sliding movement of each of said slide guide members; and a shutter contacting an inclined portion of each of said slide guide members and opening due to the sliding movement of each of said slide guide members.

7. The card cassette according to claim 4, wherein the card producing apparatus includes a first and a second pair of pins for positioning said card cassette and wherein the card cassette further comprises two sets of pin holes for receiving the first and second pair of pins of the card producing apparatus;

a pair of slide guide members that have a sliding movement when each of said first and second pins has been inserted through each said pin holes, each of said second pair of pins contacting an inclined portion of a notch of said slide guide members when said second pair of pins has been inserted through said pin holes;

a pair of slide springs opposing said sliding movement of each of said slide guide members; and a shutter contacting an inclined portion of each of said slide guide members, said shutter opening as a result of said sliding movement of each of said slide guide members.

8. The card cassette according to claim 4, wherein each end portion of an opening of said card outlet is larger than a thickness of one of said cards, but smaller than two of said cards, and a height of a middle portion of said card outlet is larger than a height of an embossed card, thereby preventing a possible feeding out of two cards.

9. The card cassette according to claim 4, wherein said protection means comprises:

a kicker connected to a first end of said card cassette for feeding out each said plurality of cards;

a rectangular shaped kicker operating hole within a first end of said inner box; and a spacer between said inner and outer box, partially covering said kicker operating hole, a diagonal of said kicker operating hole being shorter than a shorter edge of each said cards due to the existence of said spacer.

* * * * *